Aug. 13, 1929.  M. S. HOWARD  1,724,762
VERNIER TUNING DIAL
Filed Oct. 16, 1926    3 Sheets-Sheet 1

Inventor
Monroe S. Howard,
BY
ATTORNEYS

Aug. 13, 1929.　　　M. S. HOWARD　　　1,724,762
VERNIER TUNING DIAL
Filed Oct. 16, 1926　　　3 Sheets-Sheet 2

Inventor
Monroe S. Howard
BY
ATTORNEYS

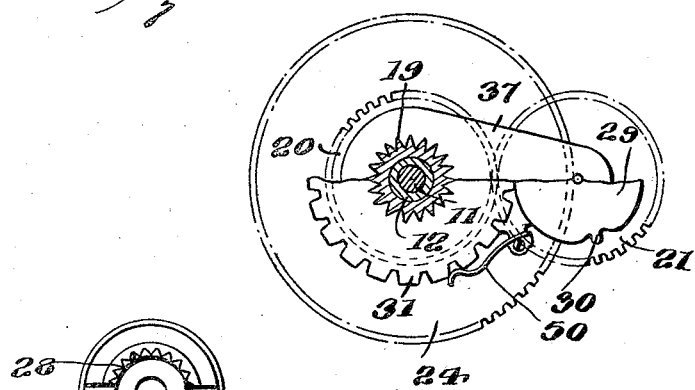
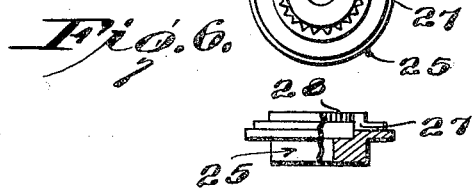
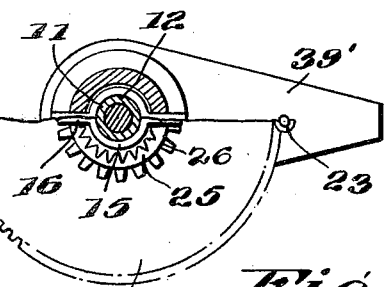
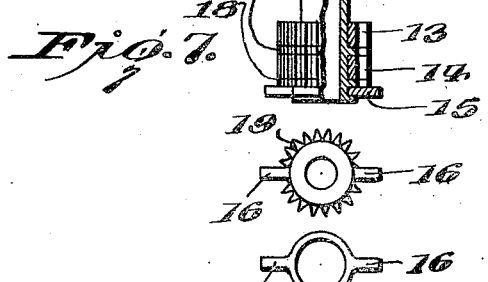
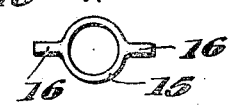

Patented Aug. 13, 1929.

1,724,762

UNITED STATES PATENT OFFICE.

MONROE S. HOWARD, OF HASTINGS, MINNESOTA.

VERNIER TUNING DIAL.

Application filed October 16, 1926. Serial No. 141,992.

This invention relates to a vernier dial for radio receiving sets.

As is well known vernier dials for radio receiving sets now commonly employed are intended to provide for a fine adjustment of a condenser shaft or other element controlled thereby. This fine adjustment is accomplished by providing a train of gears, friction wheels, or the like, between the control knob and the controlled shaft, whereby the knob must be rotated several times to obtain one complete rotation of the controlled shaft.

The term "vernier" as applied to dials above characterized is a misnomer. A "vernier" is a contrivance for measuring fractional portions of one of the equal spaces into which a scale or limb of a graduated instrument is divided. The devices heretofore referred to as commonly called "vernier control" do provide for micrometer adjustment of the element controlled thereby, yet they do not permit a direct reading of fractional parts of the divisions of a dial scale.

It is the object of this invention to provide a true vernier dial, that is a dial that makes possible the direct reading of fractional parts of the divisions of a dial with accuracy and ease.

It is also an object of the invention to provide an accurate operating means for the dial.

The invention is illustrated by way of example in the accompanying drawings, in which:—

Figures 4 and 5 are sectional views taken through the gearing shown in Figure 2, Figures 6 and 7 are detail views of elements employed in gearing shown in Figure 2.

Figure 1:
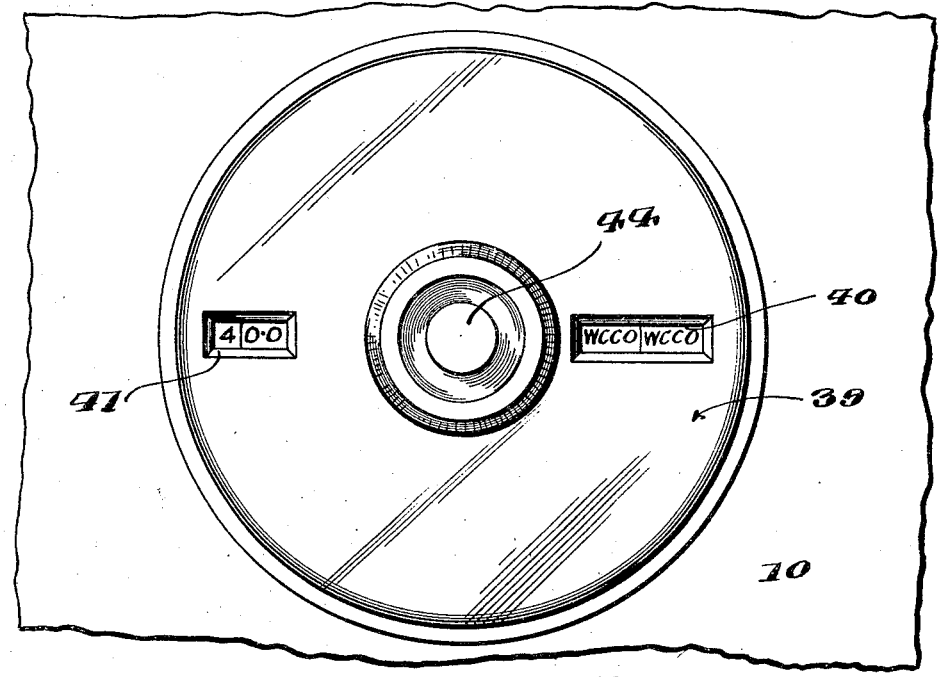
Figure 1 is a front face view of my vernier dial.

Referring to the drawings more particularly, 10. (Fig. 2) indicates a panel through which there extends a shaft 11. The shaft 11 may be of a condenser shaft of a radio receiving apparatus or it may be a shaft of some other unit. In carrying out my invention I fit upon the shaft 11 a sleeve 12 which carries two toothed collars 13 and 14 free to rotate thereon. This sleeve has also freely rotatable thereon a ring 15 having the diametrically disposed fingers 16. The sleeve 12 has integral therewith the two gears 18 and 19 which are identical to the tooth collars as to number of teeth. Gear 18 fits within a centrally and internally toothed aperture of a spur gear 20. The gear 20 engages a spur gear 21 fixed to a stub shaft 22. Also fixed to shaft 22 is a small gear or pinion 23 which engages a large spur gear 24. The gear 24 is free to rotate upon the inner end portion of a hub 25 which is fixed upon shaft 11. The gear 24 has its inner periphery provided with notches 26 with which the ends of fingers 16 of ring 15 may engage. The fingers 16 of ring 15 also slide freely in slots 27 provided in the inner end of hub 25. When the fingers 16 are in the position shown in Fig. 2, they lock the hub 25 and gear 24 together so that they rotate as a unit. However, if the fingers 16 are pushed to the inner end of slots 27, the hub 25 is released from gear 24 and said hub can be rotated while the gear remains stationary.

Figure 3:
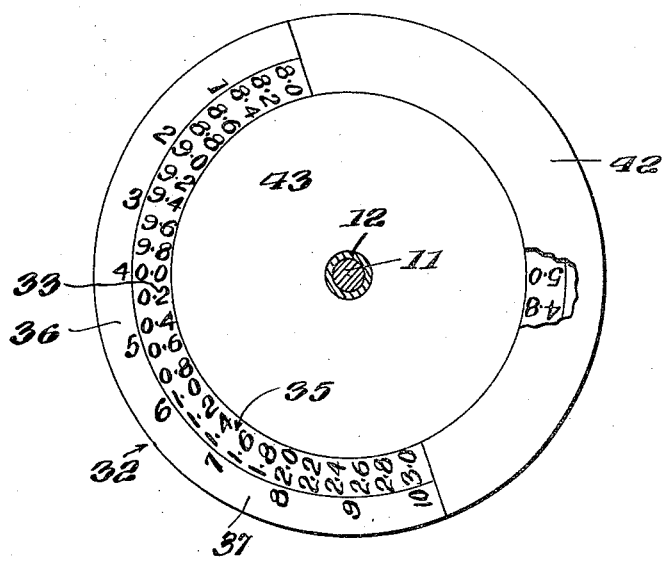
Figure 3 is a view similar to Figure 1 with the dial case removed.
Figure 8:
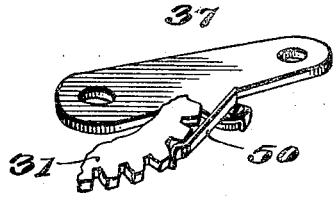
Figure 8 is a detail view illustrating a spring control for the gearing shown in Figure 2.

The outer end of the hub 25 has its inner periphery provided with teeth 28 adapted for receiving the gear 18 of the sleeve 12, and thus to lock the hub 25 to the sleeve 12 when said sleeve is forced inwardly to bring the fingers 16 of ring 15 to the inner end of slots 27 to release the gear 24. Upon the stub shaft 22 there is fixed a disc 29 so as to rotate with the gear 21 also fixed upon the stub shaft 22. The disc 29 has one tooth 30 which engages with the teeth of an intermittent gear 31. The intermittent gear 31 has an internally toothed central opening which meshes with the toothed collar 14 and thereby locks the gear 31 with a disc 32 which is also provided with a centrally toothed aperture engaging with the toothed collar or gear ring 14. When the gear ring or tooth collar 14 is in its normal position the same locks together the disc 32 and intermittent gear 31. A disc 33 is provided with a central aperture which is toothed to mesh with the gear 19 of sleeve 12. The discs 32 and 33 may be referred to as dial members. The disc 33 is the fast moving member of the dial and as shown in Fig. 3 about its peripheral edge there may be provided a scale constituting ten divisions. A division is indicated by the reference character 35 and each division 35 is equal to one division 36 of a scale provided upon the raised peripheral portion 37 of the disc 32. The scale upon disc 32 should only include one half of the circumference of the dial as best shown in Fig. 3 while the scale upon disc 33 should extend the entire circumference thereof. Each division 35 of disc 33 may be divided into ten equal parts and the proper numerals shown for such division. I have only shown even numbers which would occur in dividing each division 35 of disc into ten equal parts. Also before each of the numbers representing tenths of a division I place the number of the division to which the same belongs.

It should be here pointed out that the stub shaft 22 is supported by a plate 38 which is secured to dial casing 39 as at 40 and which has its inner end provided with an aperture or opening and fitted upon the hub 25. The stub shaft is further supported by a plate 39′ which is preferably journaled upon the hub of gear 31.

The top of cover 39 is preferably provided with two openings 40 and 41. The disc 32 has its enlarged peripheral portion 37 provided with an inwardly extending semicircular flange 42. Also upon the sleeve 12 there is fitted a disc 43 which is smaller than the disc 33.

The sleeve 12 may be rotated through a knob 44 which is secured to shaft 11 by a set screw 45. The toothed collar 13 forms a bearing for sleeve 12 in top of casing 39.

It should be here noted that the gears 20 and 21 have equal diameters, and consequently the stub shaft 22 revolves at the same rate as the sleeve 12 or the same rate as the disc 33 when said disc is locked with the sleeve 12. It also should be here noted that the ratio of the intermittent gear train 29 and 31 is such that the disc 32 is advanced one twentieth of a revolution for each revolution of the disc 33, and one half revolution for ten revolutions of disc 33.

Figure 2:
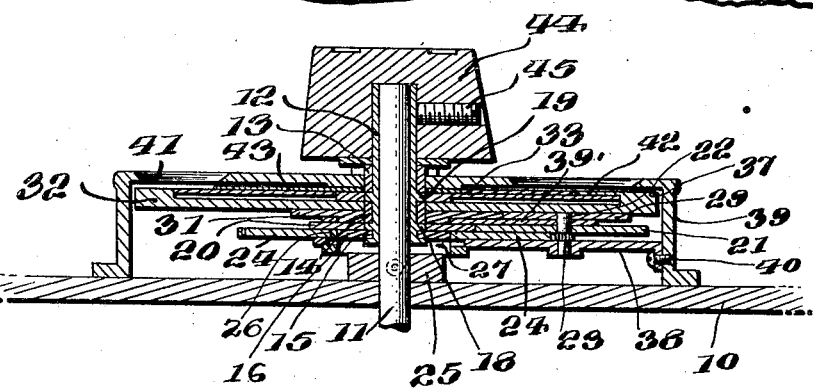
Figure 2 is a transverse section through the dial.

With the knob 44 and sleeve 12 in the position shown in Figure 2, the dial disc 33 and the gear 20 are locked to the sleeve 12 through the gears 18 and 19 and consequently turn directly with the knob 44. The dial disc 32 and intermittent gear 31 are locked together by the toothed collar or gear 14 and consequently rotate together about the sleeve 12. The gear 24 and hub 25 are locked to rotate together by the fingers 16 of ring 15. With the gears and other members positioned as above described rotation of the knob 44 produces relative turning movement of the dial discs 32 and 33. The dial disc 33 will rotate directly with the sleeve 12 while the dial disc 32 will be rotated through the intermittent gearing to move said disc one twentieth of a revolution for each complete revolution of the dial disc 33 or one half revolution for each ten revolutions of the dial disc 33. The scales of the dial discs may be read through window or opening 41 of cover 39. The scales can indicate wave lengths as is usual in a device of this kind. The numbers on dial disc 32 would indicate tens and hundreds of the number registering with the window 41 while the numbers upon dial disc 33 would indicate "units" and fractional parts thereof. By this arrangement the dial provides a direct reading and such reading can be made accurately to one-tenth of the ordinary dial division, that is such as commonly employed upon "vernier" control dials heretofore mentioned.

The second window 40 in casing 39 provides an opening to permit letters or other symbols to be made upon the disc 43 and flange 42 as illustrated in Fig. 1, and thus enable another means of indicating when the rotating element of the associated condenser is in proper position for different wireless stations.

In order to hold the dial 32 in the required position during that part of the revolution of gear 27 when its tooth is not in mesh with any teeth of gear 31, I provide a spring finger 50. The spring finger 50 permits movement of the intermittent gear 31 when engaged by tooth of gear 29 but otherwise holds said dial against turning movement.

For course adjustment of the shaft 11 and without disturbing the readings obtained upon the dial discs, the knob 44 is pushed inwardly to bring the fingers 16 of ring 15 into inner end of slots 27. The fingers 16 become disengaged from the gear 24, the gear or toothed portion 18 of sleeve 12 slips into and engages the teeth 28 of hub 25, and locks the hub 25, sleeve 12 and knob 44 together, so that the shaft 11 and hub 25 are rotated together through knob 44. At this time the gear 20 and intermittent gear 31 are locked together by collar or ring gear 14 and thus locking all gears in position. The tooth portion 19 of sleeve 12 becomes disengaged with dial disc 33 and interlocks with the dial disc 32 and the toothed collar or ring gear 13 engages the dial disc 33 thereby locking the same to the casing 39. By the operation recited, the shaft 11 can be roughly adjusted without disturbing the relation or reading of the dial discs 32 and 33.

It should be here noted that the change from direct drive of the shaft controlled to a gear drive and vice versa, can be effected only when the teeth of all the elements are in line and as there are twenty teeth this operation can be effected once for each revolution of the dial disc 33 and knob 44.

While I have shown and described a certain means for operating the dial discs 32 and 33 it is to be understood that I am well aware of the fact that other operating means might be employed for the same purpose as indicated by the appended claims.

I claim:

1. In a dial construction of the character described, a pair of rotary dials having interrelated indicia thereon, means whereby the dials may be connected to a rotatable member, and connecting means between the dials whereby one complete rotation of one dial will cause an intermittent movement of the other dial, and the degree of movement of the rotatable member at all times will be indicated by the combined reading of the indicia upon said dials.

2. In combination, a rotatable shaft, a pair of concentric dials, interconnecting means between the dials and shaft whereby with a predetermined degree of rotation of the shaft one dial will be given a complete rotation and at the completion of each predetermined degree of rotation of the shaft the other dial will be given a fractional rotation, and indicia upon the dials adapted to afford a combined reading for ascertaining any fractional rotation of the shaft.

3. In combination, a rotatable shaft, a pair of concentric dials, interconnecting means between the dials and shaft whereby with a predetermined degree of rotation of the shaft one dial will be given a complete rotation and the other dial will at the termination of the predetermined degree of rotation of the shaft be given a degree of rotation corresponding to that imparted to the shaft, and indicia upon the dials adapted to afford a combined reading for ascertaining any fractional rotation of the shaft.

MONROE S. HOWARD.